United States Patent [19]

Penney

[11] Patent Number: 5,325,131
[45] Date of Patent: Jun. 28, 1994

[54] MULTIFORMAT TELEVISION SWITCHER

[75] Inventor: Bruce J. Penney, Beaverton, Oreg.

[73] Assignee: Tektronix, Inc., Wilsonville, Oreg.

[21] Appl. No.: 55,099

[22] Filed: May 3, 1993

[51] Int. Cl.$^5$ .................. H04N 5/46; H04N 5/268
[52] U.S. Cl. .................. 348/706; 348/556; 348/445
[58] Field of Search .................. 358/11, 12, 140, 183, 358/181, 21 R; H04N 5/46, 5/44, 7/01, 5/268

[56] References Cited

U.S. PATENT DOCUMENTS

| | | | |
|---|---|---|---|
| 4,743,958 | 5/1988 | Bannister et al. | 358/181 |
| 4,748,496 | 5/1988 | Drary et al. | 358/12 |
| 4,800,426 | 1/1989 | Glenn | 358/141 |
| 5,218,436 | 6/1993 | Sugiyama et al. | 358/140 |

FOREIGN PATENT DOCUMENTS 127680 4/1992 Japan .................. H04N 5/46

Primary Examiner—James J. Groody
Assistant Examiner—Glenton B. Burgess
Attorney, Agent, or Firm—Francis I. Gray

[57] ABSTRACT

A mulltiformat television switcher adds an up-converter, a down-converter and an auxiliary selector to an existing master control switcher to provide the ability to provide both a standard format output video signal (NTSC, PAL, SECAM, etc.) and a HDTV format output video signal corresponding to a selected input video signal from a plurality of input video sources which include both standard and HDTV formats. The master control switcher provides a selected one of the standard format input video signals to a standard format input of the auxiliary selector and to the up-converter, and provides a control signal to the auxiliary selector. The HDTV format input video signals and the HDTV format video signal output from the up-converter are applied to HDTV inputs of the auxiliary selector. The auxiliary selector provides an HDTV format output video signal, selected from the HDTV inputs, and a corresponding standard format output video signal, selected from the standard format inputs, according to the video signal source selected by an operator at the master control switcher. A down-converter converts the HDTV format output video signal to a standard format video signal that is applied to other standard format inputs of the auxiliary selector. When the operator selects the video signal source, it is either up-converted or down-converted as necessary and output in both formats by the auxiliary selector.

1 Claim, 1 Drawing Sheet

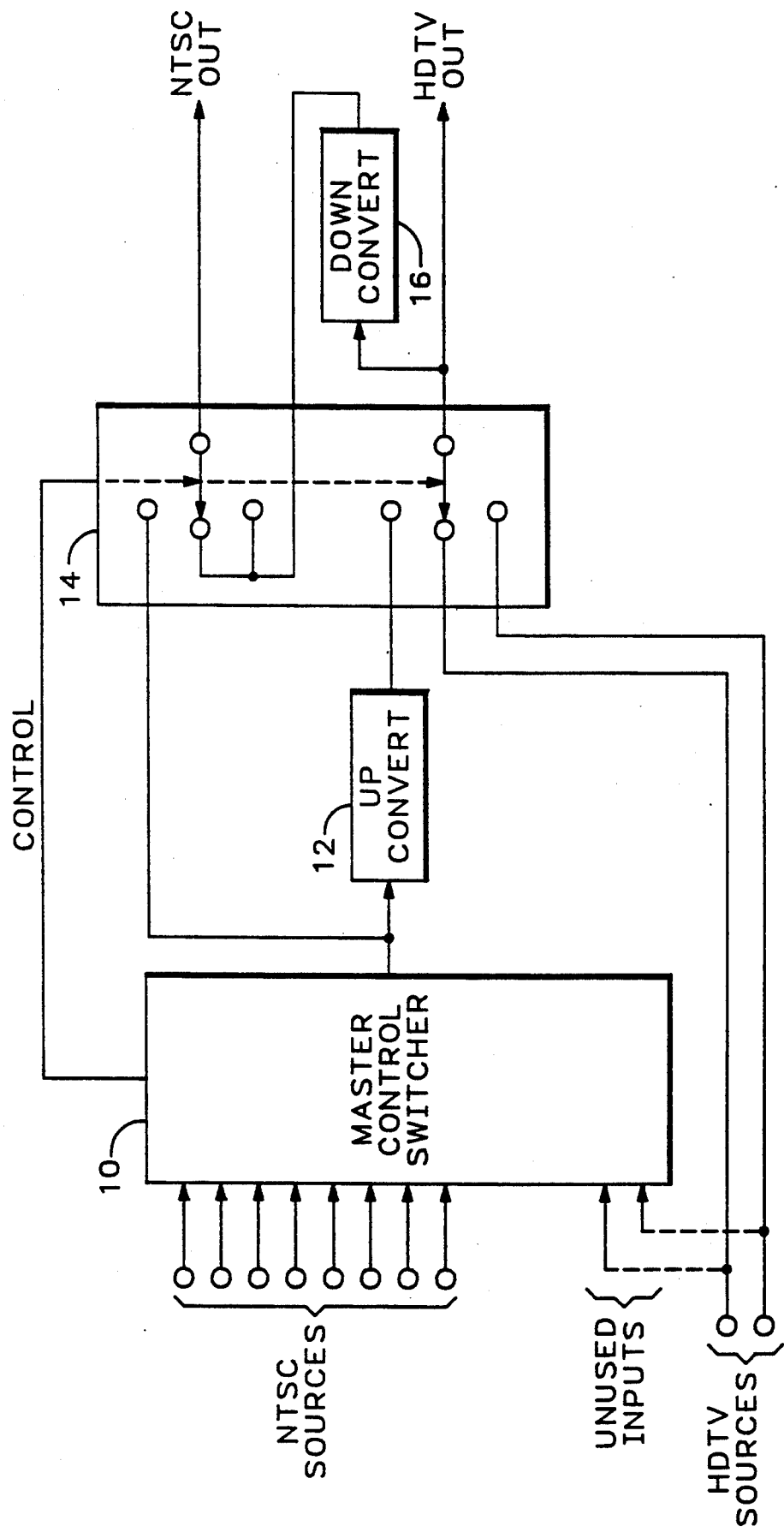

MULTIFORMAT TELEVISION SWITCHER

BACKGROUND OF THE INVENTION

The present invention relates to television switchers, and more particularly to a multiformat television switcher which combines high definition television (HDTV) signal switching and format conversion with an existing master control switcher to provide HDTV upgrade for existing television switchers.

Currently television switchers are designed for a specific television video format, such as PAL, NTSC, SECAM, HDTV or the like. In order to accommodate multiple formats the video source has to be converted into the format acceptable to the television switcher before being input to the television switcher. One solution for a digital video effects device, as embodied in the Kaleidoscope digital picture manipulator (DPM) manufactured by The Grass Valley Group, Inc. of Grass Valley, Calif., United States of America, is disclosed in U.S. Pat. No. 4,743,958, issued on May 10, 1988 to Richard S. Bannister et al entitled "Multiple Television Standards Input Selector and Convertor." This solution has multiple standard format analog video signals as inputs to a source selector, and an adaptive format converter for converting any standard analog video format to a specified digital format which is compatible with the digital picture manipulator. The DPM is set up according to the format of the analog video signal at each input to the source selector. When a particular source is selected, the appropriate commands are applied to the adaptive format converter to configure it to convert the selected analog video signal to the standard digital format.

The analog video signals input to the multiformat input selector described above all share common line, field and frame rates. The input signals all need to be processed in component digital form, so no unnecessary format conversions are performed. However where the input signals have substantially different line rates, and even different field rates, such as HDTV signals versus standard NTSC or PAL signals, unnecessary conversion between formats degrades image quality. Therefore it is desirable to pass signals without format conversion wherever possible.

What is desired is a multiformat television switcher which combines HDTV signal switching and format conversion with existing master control switchers to provide HDTV upgrade for existing television switchers.

SUMMARY OF THE INVENTION

Accordingly the present invention provides a multiformat television converter which combines HDTV signal switching and format conversion with existing master control switchers to upgrade existing television switchers. Television signals from standard format video sources, such as NTSC, PAL, SECAM, etc., are input to an existing master control switcher. The master control switcher provides a control signal to an auxiliary selector according to a source selected by an operator. An output television signal from the master control signal is input to a video format up-converter and to one input of the auxiliary selector. Also applied to inputs of the auxiliary selector are television signals from HDTV sources. The auxiliary selector has a standard format output and an HDTV format output. Coupled between the HDTV format output and another input of the auxiliary selector is a video format down-converter. The up-converter converts standard format signals to HDTV signals, and the down-converter converts HDTV signals to standard format signals. The control signal determines which input is transmitted to the outputs in both standard and HDTV formats.

The objects, advantages and other novel features of the present invention are apparent from the following detailed description when read in conjunction with the appended claims and attached drawing.

BRIEF DESCRIPTION OF THE DRAWING

The FIGURE is a block diagram view of a multiformat television switcher according to the present invention.

DESCRIPTION OF THE PREFERRED EMBODIMENT

Referring now to the FIGURE an existing master control switcher 10 has as inputs video signals from a plurality of sources, such as NTSC, PAL, SECAM, etc. The master control switcher outputs a control signal, such as a "tally" signal, and a selected video signal from among the video sources in the standard video format. The selected video signal is input to a video format up-converter 12, which converts the selected video signal into an HDTV video signal. HDTV signals from HDTV sources and the HDTV video signal from the up-converter 12 are applied to one set of inputs of an auxiliary selector 14. The auxiliary selector 14 has two outputs, a standard format output and an HDTV output. A video format down-converter 16 is coupled to the HDTV output of the auxiliary selector 14 to convert the HDTV output signals to a standard format video signal. The standard format video signal from the down-converter 16 and the selected video signal from the master control switcher 10 are applied to a second set of inputs of the auxiliary selector 14. The control signal controls the auxiliary selector 14 to determine which input video signal is applied to the respective outputs.

As shown the selected video signal is applied to the first position of one set of inputs for the auxiliary selector 14, and the corresponding HDTV video signal from the up-converter 12 is applied to the first position of the other set of inputs. Likewise two different HDTV sources are coupled to the second and third positions of the other set of inputs, while the output of the down-converter 16 is applied to the second and third positions of the one set of inputs. The standard format output selects from the set of inputs having standard format video signals as inputs, and the HDTV format output selects from the set of inputs having HDTV format video signals as inputs.

The control signal acts on the auxiliary selector 14 so that the selected input video signal, whether from a standard video format source or from an HDTV format source, is provided at the two outputs in the appropriate format. A number of unused inputs on the master control switcher 10 may be designated as HDTV inputs. An operator controls the switcher 10 as though these inputs actually have HDTV signals, even though the switcher cannot actually process HDTV signals. Whenever an HDTV input is selected by the operator, the auxiliary switcher 14 responds to the control signal to select the HDTV signal. The control signal may be the conventional "tally" output. Alternatively the control signal may be derived by putting an identifying signal on the unused inputs that have been designated as HDTV inputs, and sensing these identifying signals on the output of the switcher. Thus the selected input signal may be displayed simultaneously on both a standard format video monitor and an HDTV format video monitor without unnecessary format conversion.

Thus the present invention provides a multiformat television switcher that uses an existing master control switcher to provide a control signal and to switch a selected standard format video signal to the output, an auxiliary selector having one set of inputs for receiving standard format video signals and another set for receiving HDTV format video signals as well as providing both a standard format and an HDTV format output, an up-converter for converting the output from the switcher to HDTV format that is applied to the HDTV format inputs and a down-converter for converting the HDTV format output to standard format video signals that is applied to the standard format inputs, the control signal causing the auxiliary selector to select in parallel a standard format video signal and a corresponding HDTV format video signal at the outputs according to the selected input video signal.

What is claimed is:

1. A multiformat television switcher comprising:
   an auxiliary selector having two sets of inputs, the first set for receiving standard format video signals and the second set for receiving HDTV format video signals, and two outputs, the first output providing a standard format video output signal and the second output providing an HDTV format video output signal, the auxiliary selector passing one of the first set of inputs to the first output and the corresponding one of the second set of inputs to the second output as determined by a control signal;
   a master control switcher having a plurality of standard format inputs, the master control switcher providing the control signal and a selected one of the standard format inputs as outputs, the selected one of the standard format inputs being applied to one of the first set of inputs;
   means for converting the selected one of the standard format inputs into an HDTV format video signal, the HDTV format video signal being applied to one of the second set of inputs; and
   means for converting the HDTV format video output signal into a standard format video signal for application to the first set of inputs.

* * * * *